Aug. 10, 1965  D. H. BROOKS  3,199,923
FLUIDIZED BED DISPENSER
Filed Jan. 24, 1961  2 Sheets-Sheet 1

Inventor
DONALD HERBERT BROOKS
By James E. Bryan
Attorney

Aug. 10, 1965  D. H. BROOKS  3,199,923
FLUIDIZED BED DISPENSER
Filed Jan. 24, 1961  2 Sheets-Sheet 2

Inventor
DONALD HERBERT BROOKS

By James E. Bryan
Attorney

United States Patent Office 3,199,923
Patented Aug. 10, 1965

3,199,923
FLUIDIZED BED DISPENSER
Donald Herbert Brooks, District Vanderbijl Park, Transvaal, Republic of South Africa, assignor, by mesne assignments, to International Protected Metals, Inc., a corporation of New Jersey
Filed Jan. 24, 1961, Ser. No. 84,551
Claims priority, application Republic of South Africa, Feb. 12, 1960, 60/4,595
6 Claims. (Cl. 302—29)

The present invention relates to the production of films, in particular but not exclusively to the coating of sheet materials, in particular sheet metal, e.g. in the form of continuous strip or as individual sheets.

It is an object of the invention to provide a method and means for rapidly and economically coating the above-mentioned kind of material with a coating material available in particulate form.

It is a further object of the invention to provide a method and means for evenly applying a particulate coating material onto a sheet material to be coated.

In particular it is an object of the invention to provide a method and means for coating sheet material with a thermoplastic coating material.

According to a particular aspect of the invention, the said invention also quite generally has the object of producing unorientated thermoplastic films, whether in the form of coatings or not.

It is known to produce thermoplastic films, inter alia by calendering or blowing methods. The known methods invariably result in an orientated product, i.e. the properties of the product differ in longitudinal direction from those in lateral direction.

It is an object of the present invention to afford a method of producing thermoplastic films which offer the distinct advantage for some applications unorientated in their properties. The method furthermore allows the production of films from certain materials which are thermoplastic in principle, but which hitherto could not be fused sufficiently for a satisfactory film production without chemical deterioration.

Further objects, advantages and applications of the invention will become apparent from the following description:

A process in accordance with the invention for the production of a coherent layer from originally particulate material comprises aerating the said particulate material in an upwardly moving finely divided stream of gas in a laterally confined space, producing an even screen of falling particles by allowing particulate material to escape through a substantially horizontal gap in the lateral confinements of the said space, said gap being below the surface of the aerated bed of particulate material and further comprises moving an upwardly directed surface through the said screen of particulate material at a rate so adapted to the rate of flow of the screen that a desired thickness of particulate material is applied to the said surface and maintaining conditions suitable for the fixation of the particulate material into a coherent layer.

More particularly, a coating method in accordance with the invention comprises aerating a particulate coating material through an aerating support forming the bottom of an aerating vessel containing the bed of particulate material, producing an even screen of falling coating material particles, preferably of a width corresponding to the width of the area to be coated by allowing particulate material to escape through a horizontal slot in the aerating vessel below the surface of the aerated bed of particulate material and further comprises moving the sheet material to be coated through the screen of falling particulate material at a rate so adapted to the rate of flow of the screen that a suitable thickness of coating material is applied to the sheet material and maintaining conditions suitable for the adherence of the particulate coating material to the surface being coated.

The above-described process may be modified for the purpose of producing loose unorientated thermoplastic films. The modification comprises aerating a particulate thermoplastic material through an aerating support forming the bottom of an aerating vessel containing the bed of particulate material, producing an even screen of falling particulate material, by allowing particulate material to escape through a horizontal slot or equivalent in the aerating vessel below the surface of the aerated bed of particulate material and further comprises moving the above-specified surface, to which the particulate material is to be applied, through the stream of falling particulate material at a rate so adapted to the rate of flow of the screen that a suitable thickness of particulate material is applied thereto, causing the particles to fuse into a continuous film, allowing said film to solidify and peeling off the said surface.

The particulate material in the aerating space may be maintained in a state of aeration known as a fluidised bed, however, advantageously so-called static aerate conditions are maintained, a static aerate being a specific state of aeration intermediate between that of a conventional fluidised bed and the loosely settled material.

The rate of flow of the particulate material through the said horizontal gap or slot may be wholly or partly controlled by controlling the flow-rate of the aerating medium. A particularly smooth and even powder feed is achieved by allowing the said particulate material to escape through a horizontal slot, at least the lower limitation of which is provided by a roller, and causing said roller to rotate in a sense opposed to the direction of flow of the escaping particulate material.

The process is preferably carried out with comparatively coarse powders, say having a particle range of approximately 100 to 200 mesh (ASTM). With powders in this particle range the peripheral speed of the roller is preferably maintained in the range of between 25 and 400 ft. per minute, say 25–250 ft. per minute, depending on the flow properties of the powder. Poorly flowing powders require high peripheral speeds of the roller. The roller diameter, i.e. the curvature of the roller apparently has little effect on the efficiency of the process. However, it is important that the roller be made very smooth, e.g. of very smooth metal, e.g. polished metal.

According to one embodiment of the invention, the process is carried out by allowing the powder to escape through a slot of which the upper limitation is also presented by the periphery of a roller and in this embodiment the upper roller is caused to rotate in an opposite sense to that of the lower roller, the peripheral speed of the upper and lower rollers being not necessarily kept the same.

The process is preferably carried out in such a manner that the sheet material or other surface is passed through the powder screen at relatively high speeds, say between 200 and 300 ft. per minute. Under these conditions the height of the slot may be maintained say between ⅛ and ¼″.

The process is preferably carried out with powders composed of approximately spherical particles, and the preferred particle size range of between 100 and 200 mesh was arrived at because finer powders tend to be less free-flowing, and with coarser powders fusion may become difficult when the powder is a thermoplastic powder, which is to be fused onto the sheet material, as is usually the case of the most frequent application of the present process.

Whereas it is normally preferred to maintain a static aerate, i.e. a condition of aeration intermediate between that of a fluidised bed and that of the loosely settled powder throughout the aerating chamber, it is also possible to maintain a truly fluidised bed in that part of the aerating vessel which is remote from the slot and then allowing the powder mass to collapse as it progresses towards the slot. The latter procedure is particularly suitable when working with powders unsuitable for being brought into the static aerate state directly or for being maintained in that condition over prolonged periods, in particular powders composed of jagged and interlocking particles.

In order to obtain an even screen of particulate material, it is also possible to provide a downwardly sloping absolutely smooth and straight ramp, approximately level with the lower edge of the said slot and allowing the said particulate material to slide from the slot over the said ramp. The slope of the said ramp is normally set to be less than the normal angle of repose of the unaerated particulate material. Depending on the type of particulate material employed, The slope may for example be between 10 and 45°.

Any surplus of particulate material applied to the surface beyond the amount required for the coating or other coherent layer may be withdrawn from the surface of application shortly after the passage of the sheet material or the like through the screen of particulate material, e.g. by means of suction and, or by allowing the surplus to fall off by gravity, and the material thus withdrawn may be returned to the aerating vessel. In practice it is actually desirable to regulate the powder feed in such a manner that an excess of the order of 25% is applied to the surface beyond the amount of powder which will eventually form the coherent layer.

In many cases it is also advantageous to apply the particulate material in such a manner that the particles not adhering to the sheet material or like surface slide over the particles already adhering until they either adhere to the surface themselves or are withdrawn from the said surface. The resulting wiping effect helps to even out the surface of the layer being produced. The particulate material, whether thermoplastic or not may also be applied to the surface being coated in the manner specified above after the surface has been rendered tacky. In the case of thermoplastic coatings, sufficient heat is applied at a suitable stage of the process to cause fusing of the thermoplastic powder to the desired extent, i.e. normally to form a smooth coherent strongly bonding coating, or in special cases to result in a rough sintered surface.

When coating sheet material with thermoplastic powder, the usual method comprises preheating the sheet material to such an extent that the particles will adhere to the surface on contact. For heating the sheet material as exactly as possible to the desired temperature, the sheet material may, for example, be passed over one or more rollers heated to a carefully controlled temperature. Prior thereto the sheet material may be heated to a temperature near the desired temperature in a preheating zone, e.g. by means of infra-red irradiation, by heating with a flame or flames, by maintaining the sheet material in a muffle or heating tunnel or the like, by induction heating or by passing a current through the material.

After the application of the thermoplastic powder, the sheet material may be passed through a fusing-zone in which the particles are caused to fuse into a coherent coating with further heat application if necessary. It may be advantageous to use the same part of the installation serving as the preheating zone also as the fusing zone.

Cooling normally follows the fusing operation.

Before passing from the fusing treatment to cooling, the sheet material bearing the layer of thermoplastic material may be subjected to additional treatment for producing a particular type of finish. For example, the material may be passed between imprinting rollers or the like, in order to impress a pattern into the coherent layer produced.

The process is preferably carried out continuously, or semi-continuously. It may easily be adapted to the coating of strip material. In this case, the strip material is preferably passed around a horizontal preferably heated roller, and the screen of particulate material is allowed to fall onto the moving strip material on the curvature of the roller, i.e. in such a manner that the powder screen hits the sheet material at an angle of less than 90°. Any surplus powder will then wipe over the curvature until it falls off under the influence of gravity or is drawn off by suction.

The process is also suitable for coating limited lengths of sheet material.

Sheet metal may advantageously be galvanised or otherwise be coated before being subjected to the abovementioned process.

When the process is applied to the coating of surfaces, said surfaces may be preheated in any suitable manner which will further the establishment of a satisfactory bond. Such pretreatments may include sand blasting or other forms of treating the metal surface or the like itself. It is also possible to apply a prime coating prior to the above described processing stages, e.g. a primer which is applied in a liquid form.

A very suitable primer for many thermoplastic coatings is for example a composition comprising nitrile rubber, epoxy or another thermo-setting resin and polyvinyl-chloride.

The process in its various forms may also be carried out with particulate thermoplastic materials of such types as are normally adversely affected by heating to the fusing temperature, e.g. by excessive oxidization or thermal decomposition.

Many essentially thermoplastic materials, e.g. polyvinylchloride and cellulose acetate-butyrate cannot normally be fused into coherent films. It has been generally accepted that such materials will decompose or oxidise excessively when heated to a temperature even approaching the temperature at which these materials would normally fuse sufficiently. The difficulty may be overcome by applying heat to the said material for a very short period at a temperature considerably above the actual fusing temperature and quenching the fused material as soon as possible. Quite generally this procedure also has the advantage of allowing a very high throughput through a plant of moderate dimensions.

The process may, for example, be carried out in such a manner that the surface passing through the said screen of falling particles is preheated to a temperature considerably in excess of the actual fusing temperature of the thermoplastic material in question, said temperature being as high as can be conveniently achieved, taking into consideration all circumstances of the process, to result in the shortest possible fusing period of the material and quenching or otherwise reducing the temperature of the material as soon as possible after the desired degree of fusion has been achieved. The very short period between the first contact of the thermoplastic material with the hot surface and a substantial reduction of the temperature, e.g. by quenching should preferably not exceed 5 seconds.

The quenching should be sufficiently efficient to cool the material to a temperature well below the temperature at which decomposition or deterioration of the thermoplastic material normally takes place and may partly result from contact with the thermoplastic powder itself, supplemented by water cooling, air cooling or even cooling with liquified gasses such as liquid nitrogen. Cooling may also be carried out by passing a sheet material or the like over suitable cooled rollers.

When working with polyvinyl-chloride powder, for example, the sheet metal or other surface may be heated to approximately 350° C., and the resin will suffer no appreciable harm if quenching follows the application of the resin in a matter of seconds.

The installation for carrying out the process comprises a feed apparatus for feeding particulate material, comprising an aerating vessel provided with an aerating support separating an aerating chamber proper containing particulate material from an air or gas box underneath the support and provided with an inlet for the aerating medium whereas the aerating chamber proper is provided with a horizontal slot of large horizontal width compared with its vertical height and further comprises a support for moving a surface to which particulate material is to be applied at a controlled speed underneath the said horizontal slot.

The feed apparatus may furthermore comprise a downwardly sloping ramp underneath the said slot and provided with a perfectly smooth upper surface. The lower edge of the sloping ramp is preferably perfectly straight and horizontal and may take the form of a knife edge.

The part of the installation comprising the said horizontal slot may also take the form of an apparatus in accordance with the invention for feeding powder at a controlled rate in the form of a screen of falling powder particles which comprises an aerating vessel provided with an aerating support, separating the chamber proper containing the particulate material from an air or gas box underneath the support and provided with an inlet for the aerating medium, whereas the aerating chamber proper is provided with a horizontal slot through one of the walls of the aerating chamber, the lower limitations of said slot being provided by the outer periphery of a smooth roller adapted to be rotated in a sense opposite to the intended flow of the powder through the slot. The said roller is preferably made of very smooth metal.

According to a particular embodiment of the invention the upper limitation of the slot is afforded by the outer periphery of a second roller parallel to the first roller and adapted to be driven in a sense opposite to that of the first roller.

The clearance between the lower roller and the upper limitation of the slot, is preferably adjustable, preferably in the range of at least between 1/8 and 1/4".

The process is preferably carried out in such a manner that the particulate material in the immediate vicinity of the said slot at least is in a relatively weak state of aeration, preferably substantially below the degree of aeration corresponding to a fluidised bed. In this manner excessive blowing out of aerating medium through the said slot may be avoided. Therefore, in the preferred apparatus, the gas-pervious bed support is only provided in a part of the aerating chamber which is remote from the said slot, whereas the bottom of the aerating chamber in the immediate vicinity of the said slot is impervious. Alternatively or in addition the space in the immediate vicinity of the said slot is downwardly and preferably also laterally screened off the remainder of the aerating chamber. The above described apparatus may also be adapted for the purpose of feeding coating powder at an even rate to a spray coating apparatus, e.g. a flame spraying apparatus. This embodiment is particularly suitable for feeding powders having poor flow properties.

In the preferred installation suction means may be provided to withdraw excess powder from the surface to which the powder is applied, the said suction means being preferably adapted to return the particulate material back to the aerating vessel.

The installation may be adapted for the continuous coating of strip materials or the continuous production of films. In this case, the installation preferably comprises a horizontal, preferably heated roller underneath the outlet of the feed apparatus around which the surface to which the particulate material is to be applied is passed. The feed apparatus for feeding particulate material is preferably provided in such a position relative to the said roller, that the powder screen falls onto the curvature afforded by said roller.

A preheating zone may take any of the forms specified above. According to a particular embodiment the preheating zone comprises electrical contacts adapted to engage in material which is to be preheated and to pass an electrical current therethrough in order to effect the said preheating.

An additional pre-treatment zone may precede the preheating zone. The pretreatment zone may be adapted to subject surfaces to be coated to any desired or required chemical or mechanical pretreatment. The pre-treatment zone may also comprise an apparatus for applying a thin film of a primer to a surface to be coated.

A fusing zone is sometimes provided following the heated roll, normally followed by a cooling zone and means for rolling up the coated material. Means for subjecting the said material to any desired or required further treatment may be provided anywhere along the path of the strip material. The said fusing zone may be made integral with the preheating zone.

Substantially the same installation as for the coating of strip material may also be used for the production of films. In the latter case the strip metal to be coated is replaced by a belt, e.g. an endless belt, having a surface to which the thermoplastic material will not adhere. The said belt may be a metal belt e.g. a polished steel belt, in particular a polished stainless steel belt, said belt being treated with a suitable release agent if required.

The invention and the manner in which it may be put into practice will be further described by way of example with reference to the accompanying drawings, without thereby limiting the scope of the invention.

In the drawings

Figure 1:
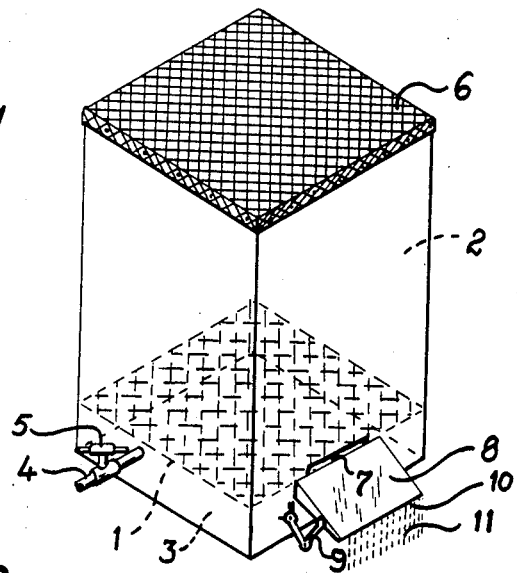
FIG. 1 represents an isometric projection of an apparatus in accordance with the invention suitable for producing a screen of particulate material for the abovementioned process in accordance with the invention.

Referring to FIG. 1 of the drawings, the apparatus shown is sub-divided by a suitable aerating support 1 into an upper aerating space proper 2 and the air or gas box 3 to which gas under pressure is admitted through pipe 4 at a rate controlled by means of valve 5. The aerating chamber is closed on top with a gas-pervious lid 6. A small distance above the support 1, a horizontal slot 7 is provided which opens onto a sloping ramp 8, the slope of which may be adjusted by means of an adjustable bracket 9. The upper surface of the ramp 8 is perfectly smooth and may, for example, be coated with a very smooth layer of plastic. The lower edge 10 of the ramp is also perfectly straight and horizontal and knife-edge-like to result in an even screen of falling particles 11.

Figure 2:
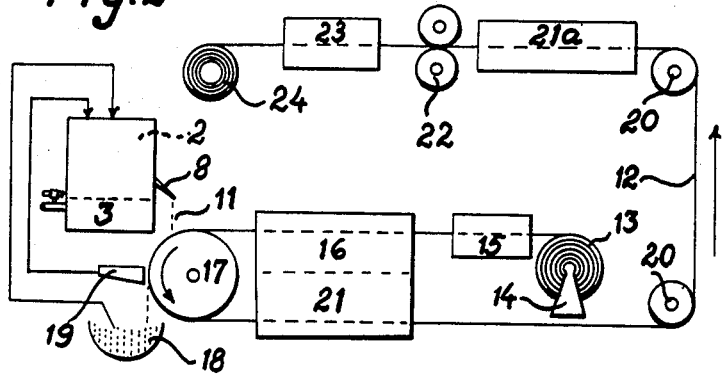
FIG. 2 represents a diagrammatic view of an installation in accordance with the invention for continuously coating strip material.

Referring now to FIG. 2, the strip material 12, e.g. galvanized sheet metal passes through the installation in the direction of the arrows. It is fed from a coil 13 supported on a stand 14, from where it first passes through a pre-treatment zone 15. The function of the pre-treatment zone 15 depends entirely on the type of sheet material being coated and on the type of coating. In the pre-treatment zone the surface to be coated may, for example, be cleaned, e.g. washed free of grease, acid dipped or pickled, sand blasted, or the like. In some cases no pre-treatment may be necessary at all. In other cases the pre-treatment zone may comprise a priming apparatus. Said priming apparatus may for example comprise one or more spraying nozzles for spraying a liquiform primer onto the surface to be coated, e.g. a nitrile rubber-epoxy resin polyvinyl-chloride primer dissolved in methyl ethyl ketone. A suitable primer is on the market under the trade name "Plastilok A978B" (Goodrich).

Subsequently the strip material passed through a heating zone 16 where the sheet material is pre-heated to a temperature close to the temperature desired for the actual coating step. The preheating zone may take the form of a heating tunnel, filled with a hot gas. It is also possible to provide gas flames or the like underneath the strip material in the preheating zone. Preheating may also take place with infra-red lamps or other suitable sources of infra-red radiation. The preheating zone may also comprise one or more induction coils so arranged as to heat the strip material passing through the preheating zone. Alternatively resistance heating by passing a current through the strip material itself may be resorted to.

The pre-heating zone is followed by a heated roller 17 around which the strip material passes. An apparatus as shown in FIG. 1 is set up above the roller 17 and a continuous screen of falling thermoplastic particles 11 falls onto the strip material by the roller 17. The downward slope thus provided causes all particles not adhering to the surface of the strip material to slide downwards exercising a wiping effect on the particles already adhering. Some of the particles may still adhere in the course of the downward sliding movement. The remainder drops into the gutter 18 or is sucked off at 19 and returned to the aerating vessel 2. The strip material then passes around idler rollers 20 after having passed through a fusing zone 21 in which additional heat is applied to cause proper fusing together and bonding of the plastic particles. The fusing zone 21 may be made integral with the pre-heating zone 16 as shown in the drawings.

In most cases a quenching zone 21a will follow the fusing zone or the roller 17 if no fusing zone is provided. The exact position of the quenching zone depends on the time interval necessary to allow the particular coating material to fuse into a continuous layer from the time it leaves roller 17. The particular design of the quenching zone will depend on the particular circumstances pertaining to a particular plant and will be obvious to those skilled in the art. In the simplest case air jets will be directed at the strip material, preferably the uncoated side of the strip material. It is also possible to pass the strip material around a suitably cooled or refrigerated roller of a type corresponding to the heated roller 17. In some cases it may be preferred to pass the strip material through a water bath for quenching.

An after-treatment zone 22 may be provided in any suitable position which depends on the particular after-treatment which it is desired to impart on the coated strip material.

In this particular example the after-treatment zone 22 takes the form of a pair of imprinting rollers for imprinting a pattern into the coating surface (normally after partial quenching). Alternatively, the after-treatment zone may be adapted to apply a further coating on top of the coating already applied. Such further coating may, for example, again be applied with an apparatus of the type shown in FIG. 1. The particular material may be identical to or different from the particular material already applied. It may again be a thermoplastic powder. On the other hand it may also be a powder of higher fusing or softening point, which merely adheres to the surface being coated as a result of the tackiness of the first coating layer.

From the after-treatment zone (if present) the strip material may pass through a final cooling zone 23 whereafter it is coiled up at 24.

The plant is suitable to be run at the relatively high speed of 200 to 300 feet per minute. When employing high temperatures for rapid fusing of the coating material, followed by quenching immediately after the completion of the fusion, the total length of the production line may be kept within very moderate limits. Assuming that the plane is operated at a strip speed of 300 feet per minute and that fusion is to be completed within a maximum of 5 seconds, the total distance from the roller 17 to the quenching zone 21a will not exceed 25 feet. In this case the strip material would for example be heated to 350° C. for the production of polyvinyl-chloride coatings. Under these processing conditions the polyvinyl-chloride does not normally suffer any appreciable thermal degradation for which this substance is generally notorious in spite of the fact that commercial polyvinyl-chlorides are generally heat-stabilized.

Obviously a large number of variations are possible. The pre-heating zone may, for example, be replaced by a zone in which a tacky prime-coating is applied, e.g. by liquid spraying, brushing or rolling on. The particulate material forming the screen 11 need not necessarily be thermoplastic at all in this case, and if not, the roller 17 need not necessarily be heated either.

Figure 3:
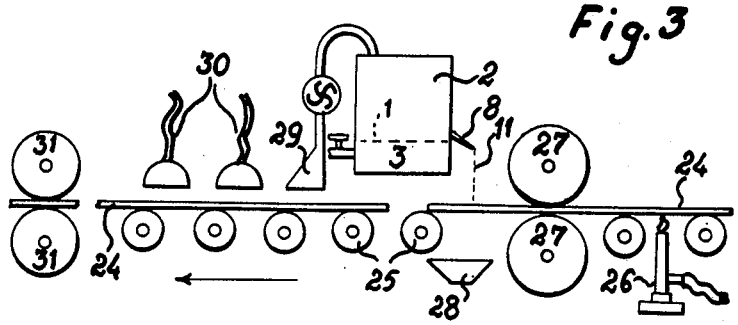
FIG. 3 represents a diagrammatic view of an installation in accordance with the invention for coating limited lengths of sheet material.

Referring now to FIG. 3, the individual sheets 24 may already have been subjected to a pre-treatment if desired or required. They are passed over conveying rollers 25 which first take them to a pre-heating zone 26, in this case diagrammatically indicated by a gas flame. From there the sheets pass between one or more heated pairs of rollers 27, immediately preceding an apparatus of the type shown in FIG. 1 from which a powder screen 11 drops onto the sheet surface. Powder falling through the gap between two successive sheets is collected in a gutter 28 and returned to the aerating space 2. Excess powder is sucked off the sheets at 29 and also returned to the aerating chamber.

The sheets then pass through the fusing zone, in this example indicated by infra-red radiators 30. The coating layer may then, for example, be provided with an imprinted pattern by the passage between rollers 31. Quenching zones may again be provided in suitable positions as in FIG. 2.

Figure 4:
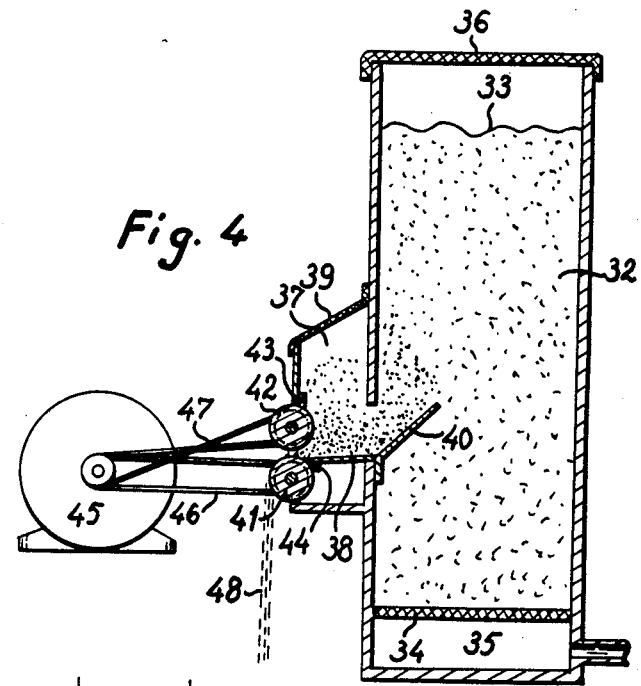
FIG. 4 represents a vertical section through an alternative embodiment of an apparatus in accordance with the invention for feeding particlate material in the form of a falling screen.

Referring to FIG. 4 of the drawings, the powder feeding apparatus is essentially a modification of the apparatus shown in FIG. 1 and is also suitable for operating with powder having poor flow properties, a characteristic which usually also involves that the powder cannot very easily be maintained for prolonged periods in the state of aeration known as a static aerate. The apparatus comprises an aerating space 32 filled with coating powder, for example maintained in the state of aeration known as a fluidised bed, the upper level of which is represented by 33. For fluidising the powder (i.e. maintaining the powder particles in whirling motion) the bottom of the aerating space is represented by a gas-pervious bed support 34 through which the aerating medium, e.g. air under slight pressure rises upwards from gas box 35. A screen of filter cloth 36 prevents fine powder from being carried away by the gas stream.

A de-aeration chamber 37 is connected sideways to the aerating vessel in a position below the normal level 33 of the fluidised bed. The bottom 38 slopes away from the aerating vessel 32. The top of the de-aerating vessel is provided by a gas-pervious air release screen 39. The de-aeration chamber is partly screened off from the rising gas stream in the aerating space by a baffle 40.

The actual powder outlet of the apparatus is provided by a pair of horizontal rollers 41 and 42 respectively.

The rollers are made of perfectly smooth metal and may, for example, have a diameter of ¾". The gap between the rollers may be made adjustable although this is not shown in the drawing. The top roller 42 is sealed against the wall of the de-aerating chamber 37 by a felt strip 43. The bottom roller 41 is similarly sealed against the bottom 38 of the de-aerating chamber by another felt strip 44. The top roller 42 is an optional feature and may be dispensed with in the manner diagrammatically indicated in FIG. 7. Both rollers are driven of a motor 45 by any suitable means, in the present example indicated for convenience's sake by endless belts 46 and 47 respectively. The two rollers are driven in opposite senses against the direction of the flow of the powder which escapes in the form of an even stream 48 between the said two rollers. In the present example it is assumed that the motor is a variable speed motor which can be adjustable to give the rollers peripheral speeds between 25 and 400 feet per minute. When operating with powders having rather poor flow properties, the speed may for example be set at 1400 r.p.m. whereas with easily flowing powder a speed of just over 100 r.p.m. is adequate.

The de-aeration chamber 37 is only necessary when operating with powders which have to be properly fluidised in order to keep them in an adequately loosened up state of at least approximately even aeration Once the powder enters the de-aeration chamber it merely loses its aeration to an adequate extent to prevent an undesirable blowing-out of aerating gas through the gap between the pair of rollers.

Figure 5:
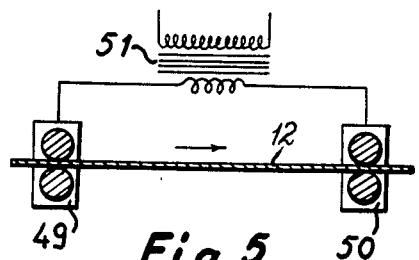
FIGS. 5 and 6 illustrate suitable arrangements for the resistance heating of strip material to be coated in some embodiments of the installation in accordance with the invention.

Referring now to FIG. 5, the sheet metal 12, prior to its being coated, passes between two pairs of rollers 49 and 50 respectively connected to the two terminals of the output side of a transformer 51. A very strong current passes through the sheet metal between the two pairs of rollers whereby the sheet metal is immediately heated up.

Figure 6:
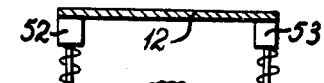

An alternative arrangement to that shown in FIG. 5 is illustrated in FIG. 6. In this example the sheet metal 12 moves in a direction normal to the paper plane. Near both edges of the sheet metal two carbon brushes 52 and 53 respectively are provided in contact with the sheet metal 12, the said carbon brushes being again connected to the output terminal of a transformer 51.

Figure 7:
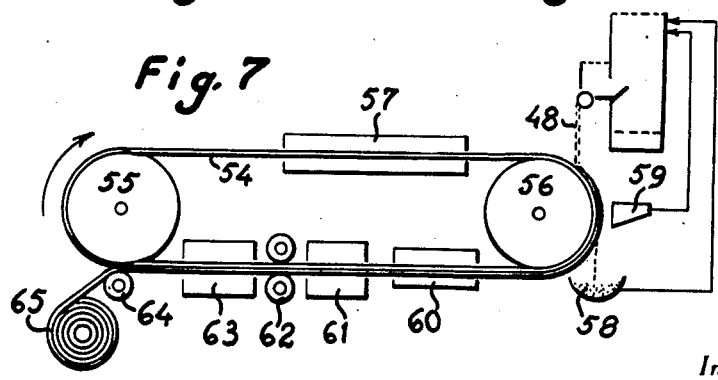
FIG. 7 is a diagrammatic representation of an installation for the continuous production of thermoplastic unorientated film.

Referring now to FIG. 7 an endless belt 54 of polished stainless steel is passed around rollers 55 and 56, at least one of which is motor-driven in the direction indicated by the arrow. Depending on the type of material used for the process the outwardly directed surface of the stainless steel belt may have been treated with a suitable release agent known in the art. Any particular portion of the stainless steel belt will move at some time or other through the preheating zone 57. It will subsequently pass around the roller 56 which is again heated as in the case of roller 17 (FIG. 2), where it is also met by a falling powder screen 48 coming from an apparatus as shown in FIG. 4. Again as in FIG. 2, surplus powder sliding off the surface of the belt 54 collects in gutter 58 and is returned to the aerating apparatus. Some loose powder may also be sucked off at 59 and similarly returned. The hot roller 56 is followed by a fusing zone 60 in which the powder adhering to the surface of the belt is allowed to fuse into a coherent layer. Fusing zone 60 is followed by a preliminary cooling zone 61 in which the belt and the plastic layer are chilled in an air current. Thereafter the plastic surface is embossed between embossing rollers 62 and finally quenched with air or water in the quenching zone 63. At 64 the plastic layer is finally peeled off the stainless steel base and passed around the roller 64 to be coiled up at 65.

What I claim is:

1. A particle dispenser comprising a container having side walls and a gas-pervious particle-supporting bottom wall, gas outlet means at the top of the container, means for passing an aerating gas upwardly through said gas-pervious bottom wall, a particle outlet through one of said side walls, baffle means internally of the container having a lower end adjacent said one wall below the particle outlet and its upper end extending upwardly and outwardly thereof for screening the particle outlet from a rising gas stream and directing a flow of particles through said particle outlet, and a sloping ramp extending downwardly and outwardly from the said particle outlet for receiving and directing particles from the said particle outlet.

2. A particle dispenser comprising a container having side walls and a gas-pervious particle-supporting bottom wall, gas outlet means at the top of the container, means for passing an aerating gas upwardly through said gas-pervious bottom wall, a particle outlet through one of said side walls, baffle means internally of the container having a lower end adjacent said one wall below the particle outlet and its upper end extending upwardly and outwardly thereof for screening the particle outlet from a rising gas stream, a de-aeration means mounted externally of the said one wall in communication with the said particle outlet, and a particle dispensing outlet communicating with said de-aeration means.

3. A particle dispenser according to claim 2, wherein the de-aeration means is a chamber mounted on the said one wall of the container.

4. A particle dispenser according to claim 3, wherein said dispensing outlet is formed through a wall of said chamber and is more constricted than the particle outlet.

5. A particle dispenser according to claim 4, comprising horizontal roller means mounted in engagement with said dispensing outlet for restricting particle flow therethrough.

6. A particle dispenser according to claim 5, wherein said roller means comprises a pair of spaced horizontal rollers each mounted in engagement with opposite portions of said dispensing outlet and the spaced rollers defining a dispensing outlet path therebetween.

References Cited by the Examiner

UNITED STATES PATENTS

| 1,854,071 | 4/52 | Schacht | 118—308 X |
|---|---|---|---|
| 2,513,434 | 7/50 | Tinsley | 117—21 |
| 2,586,818 | 2/52 | Harms | 23—284 |
| 2,723,054 | 11/55 | Louden et al. | 222—195 |
| 2,758,564 | 8/56 | Randall | 118—309 |
| 2,841,476 | 7/58 | Dalton | 23—284 |
| 2,849,752 | 9/58 | Leary | 18—10 |
| 2,886,899 | 5/59 | Watkins | 23—284 |
| 3,032,816 | 5/62 | Zimmerli | 117—21 X |

FOREIGN PATENTS 773,375   4/57   Great Britain.

OTHER REFERENCES

Rock Products, February 1950, (p. 91).

RICHARD D. NEVIUS, *Primary Examiner.*